(12) United States Patent
Halsey et al.

(10) Patent No.: US 12,441,610 B2
(45) Date of Patent: *Oct. 14, 2025

(54) SOLID STATE DELIVERY SYSTEM

(71) Applicant: GE Aviation Systems Limited, Gloucestershire (GB)

(72) Inventors: Colin John Halsey, Tewkesbury (GB); Michael David Bailey, Cheltenham (GB); Ross Jonathan Williams, Cheltenham (GB)

(73) Assignee: GE AVIATION SYSTEMS LIMITED, Gloucestershire (GB)

(*) Notice: Subject to any disclaimer, the term of this patent is extended or adjusted under 35 U.S.C. 154(b) by 875 days.

This patent is subject to a terminal disclaimer.

(21) Appl. No.: 17/353,022

(22) Filed: Jun. 21, 2021

(65) Prior Publication Data

US 2021/0309514 A1 Oct. 7, 2021

Related U.S. Application Data

(63) Continuation of application No. 15/778,977, filed as application No. PCT/EP2015/077457 on Nov. 24, 2015, now Pat. No. 11,040,875.

(51) Int. Cl.
| | |
|---|---|
| *C01B 3/06* | (2006.01) |
| *B01J 7/02* | (2006.01) |
| *C01B 3/00* | (2006.01) |
| *C01B 3/04* | (2006.01) |
| *H01M 8/0606* | (2016.01) |

(52) U.S. Cl.
CPC ............ *C01B 3/065* (2013.01); *B01J 7/02* (2013.01); *C01B 3/0005* (2013.01); *C01B 3/001* (2013.01); *C01B 3/04* (2013.01); *C01B 3/06* (2013.01); *H01M 8/0606* (2013.01); *C01B 2203/066* (2013.01); *Y02E 60/32* (2013.01); *Y02E 60/36* (2013.01)

(58) Field of Classification Search
CPC ..................................................... C01B 3/065
See application file for complete search history.

(56) References Cited

U.S. PATENT DOCUMENTS

| | | | |
|---|---|---|---|
| 3,643,834 A | * | 2/1972 | Sabatino ............... H01M 10/06 206/0.5 |
| 5,234,140 A | | 8/1993 | Demarest et al. |

(Continued)

FOREIGN PATENT DOCUMENTS

| | | |
|---|---|---|
| CN | 1589172 A | 3/2005 |
| CN | 1998106 A | 7/2007 |

(Continued)

OTHER PUBLICATIONS

International Search report and Written Opinion issued in connection with corresponding PCT Application No. PCT/EP2015/077457 dated Jul. 22, 2016.

*Primary Examiner* — Paul A Wartalowicz (74) *Attorney, Agent, or Firm* — Thomas | Horstemeyer, LLP (57) ABSTRACT

A solid state storage system includes a pressure-sealed storage unit defining an interior and having an outlet, an upper manifold and a lower manifold separated by a dividing plane having a set of ports, a set of chambers, and a solid state storage, wherein at least some gas is supplied to the outlet.

8 Claims, 6 Drawing Sheets

(56) References Cited

U.S. PATENT DOCUMENTS

| | | | |
|---|---|---|---|
| 7,254,983 B2 | 8/2007 | DaCosta et al. | |
| 7,674,540 B2 | 3/2010 | Adams et al. | |
| 11,040,875 B2* | 6/2021 | Halsey | C01B 3/04 |
| 2004/0048116 A1 | 3/2004 | Ord et al. | |
| 2005/0036941 A1* | 2/2005 | Bae | B01J 7/02 |
| | | | 423/658.2 |
| 2008/0255601 A1* | 10/2008 | Birk | A61F 5/003 |
| | | | 606/192 |
| 2011/0122584 A1* | 5/2011 | Hata | F28D 15/0233 |
| | | | 361/700 |
| 2011/0183057 A1* | 7/2011 | Jones | A47J 43/12 |
| | | | 426/474 |
| 2013/0302706 A1* | 11/2013 | Olsommer | H01M 8/04171 |
| | | | 429/413 |
| 2014/0178780 A1 | 6/2014 | Ren | |

FOREIGN PATENT DOCUMENTS

| | | |
|---|---|---|
| EP | 2062850 A2 | 5/2009 |
| EP | 2534722 B1 | 7/2015 |
| JP | 2008021514 A | 1/2008 |
| JP | 2011117543 A | 6/2011 |
| WO | 2011080746 A1 | 7/2011 |

* cited by examiner

SOLID STATE DELIVERY SYSTEM

CROSS REFERENCE TO RELATED APPLICATION(S)

This application is a continuation of U.S. patent application Ser. No. 15/778,977 filed May 24, 0218, now issued as U.S. Pat. No. 11,040,875, issued Jun. 22, 2021, which claims priority to and benefit of international application no. PCT/EP2015/077457, filed Nov. 24, 2015, both of which are incorporated herein in their entirety.

BACKGROUND OF THE INVENTION

Hydrogen can be a fuel for creating consumable energy by way of combustion in an engine or conversion from chemical energy into electrical energy through a chemical reaction, such as in a fuel cell. In the aforementioned examples, the hydrogen fuel is typically supplied in gaseous form. In order to generate consumable energy for an extended period of time in such systems, a large amount of hydrogen gas, and thus a large amount of potential energy, can be stored for consumption.

Energy storage systems for hydrogen can include gaseous storage tanks and can be configured to hold hydrogen gas at high pressures near 700 bar in order to store hydrogen in adequate quantities for particular energy consumption needs. High pressure energy storage systems, such as those storing hydrogen gases at pressures near 700 bar, must include more robust components designed to handle or account for such high pressures.

BRIEF DESCRIPTION OF THE INVENTION

In one aspect, a solid state delivery system includes a first housing defining a first interior and a second housing defining a second interior, and a dividing plane separating the first interior from the second interior and having at least one port between the first interior and the second interior blocked by at least one deformable plug. The at least one deformable plug is configured to be selectably deformed to open the at least one port, fluidly coupling the first interior and the second interior.

In another aspect, a method of releasing hydrogen gas from a solid hydrogen storage system includes receiving, by a control module, a demand signal indicative of a demand for hydrogen gas, and in response to receiving the demand signal, controlling, by the control module, initiating of a chemical reaction in a pressure-sealed housing having a chamber holding a hydrogen storage solid fluidly isolated from an opposing housing interior by a dividing plane having a port blocked by a corresponding deformable plug, by selectively supplying at least one of a reactant or heat to the housing interior and selectively deforming the plug to fluidly couple the housing interior with the chamber such that the chemical reaction liberates hydrogen gas from the hydrogen storage solid, and wherein a volume of the liberated hydrogen gas is proportional to the demand.

In yet another aspect, a method of releasing gas from a solid state storage system includes receiving, by a control module, a demand signal indicative of a demand for gas, in response to receiving the demand signal, controllably deforming at least one deformable plug disposed at a dividing plane separating a first interior of a first housing from a second interior of a second housing, and in response to the deforming of the at least one deformable plug, exposing the second interior to at least one of a reactant or heat such that the at least one of reactant or heat initiates a chemical reaction liberating gas from a solid state storage solid disposed in the second housing.

DESCRIPTION OF EMBODIMENTS OF THE INVENTION

The invention can be implemented in any environment using a solid state delivery system to provide controllable or selective access from a first space to a second space. In this sense, the system can be configured to, for example, provide selective access to allow for a first chemical in a first space to mix, combine with, or chemically react with a second chemical in a second space, wherein the first space and the second space are separated by the solid state delivery system. One non-limiting example of such a system can include an environment using hydrogen as a fuel for creating consumable energy, for example, by way of combustion in an engine or conversion from chemical energy into electrical energy through a chemical reaction. While this description is primarily directed toward a hydrogen storage system to provide hydrogen gases for conversion into electrical energy to power electrical systems for an aircraft, embodiments of the disclosure are applicable to any solid state delivery system for providing selective access between a first space or interior of a first housing and a second space or interior of a second housing. For example, while this description is directed toward an emergency power generation system in an aircraft, embodiments of the disclosure can be further applicable to provide hydrogen gases to generate stand-alone or supplemental electrical power in otherwise non-emergency operations, such as takeoff, landing, or cruise flight operations.

Figure 1:
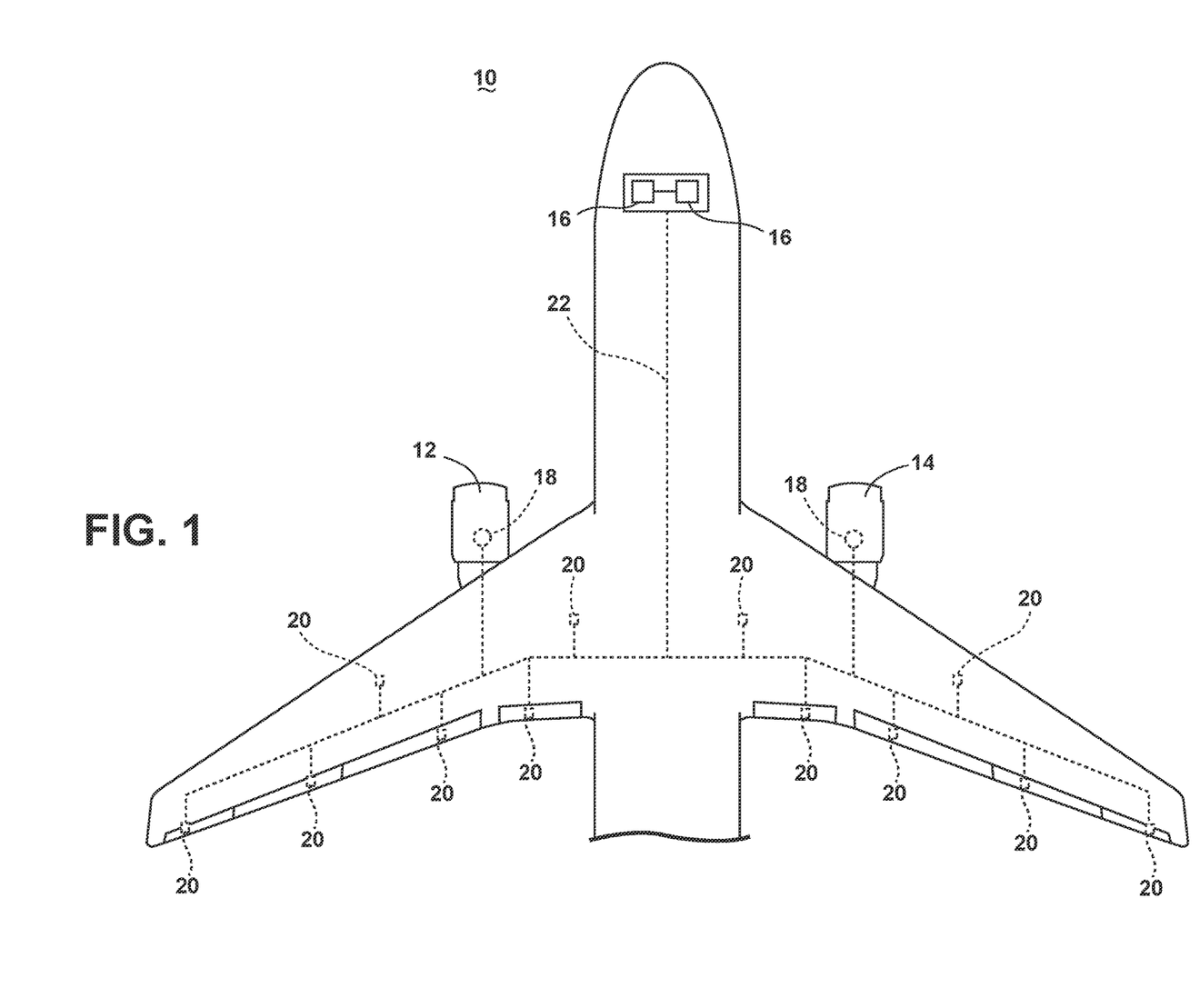
FIG. 1 illustrates a top down schematic view of an aircraft and power distribution system, in accordance with various aspects described herein.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further comprise at least one electric machine, such as a generator 18. The aircraft is shown further comprising a plurality of power-consuming components, or electrical loads 20, for instance, an actuator load, flight critical loads, and non-flight critical loads. Each of the electrical loads 20 are electrically coupled with at least one of the generators 18 via a power distribution system, for instance, bus bars 22. In the aircraft 10, the operating left and right engine systems 12, 14 provide mechanical energy which can be extracted via a spool, to provide a driving force for the generator 18. The generator 18, in turn, provides the generated power to the bus bars 22, which delivers the power to the electrical loads 20 for load operations.

The aircraft 10 or power system can include additional power sources for providing power to the electrical loads 20, and can include emergency power sources 16, ram air turbine systems, starter/generators, batteries, super capacitors, or the like. The depiction of the aircraft 10, emergency power sources 16, engines 12, 14, generators 18, electrical loads 20, and bus bars 22 are provided merely as one non-limiting example schematic aircraft 10 configuration, and is not intended to limit embodiments of the disclosure to any particular aircraft 10 or operating environment. It will be understood that while one embodiment of the invention is shown in an aircraft environment, the invention is not so limited and has general application to electrical power systems in non-aircraft applications, such as other mobile applications and non-mobile industrial, commercial, and residential applications.

Additionally, while various components have been illustrated with relative position of the aircraft (e.g. the emergency power sources 16 near the head or cockpit of the aircraft 10), embodiments of the disclosure are not so limited, and the components are not so limited based on their schematic depictions. For example, the emergency power sources 16 can be located in an aircraft 10 wing, a tail section, or farther toward the rear of the aircraft fuselage. Additional aircraft configurations are envisioned.

Figure 2:
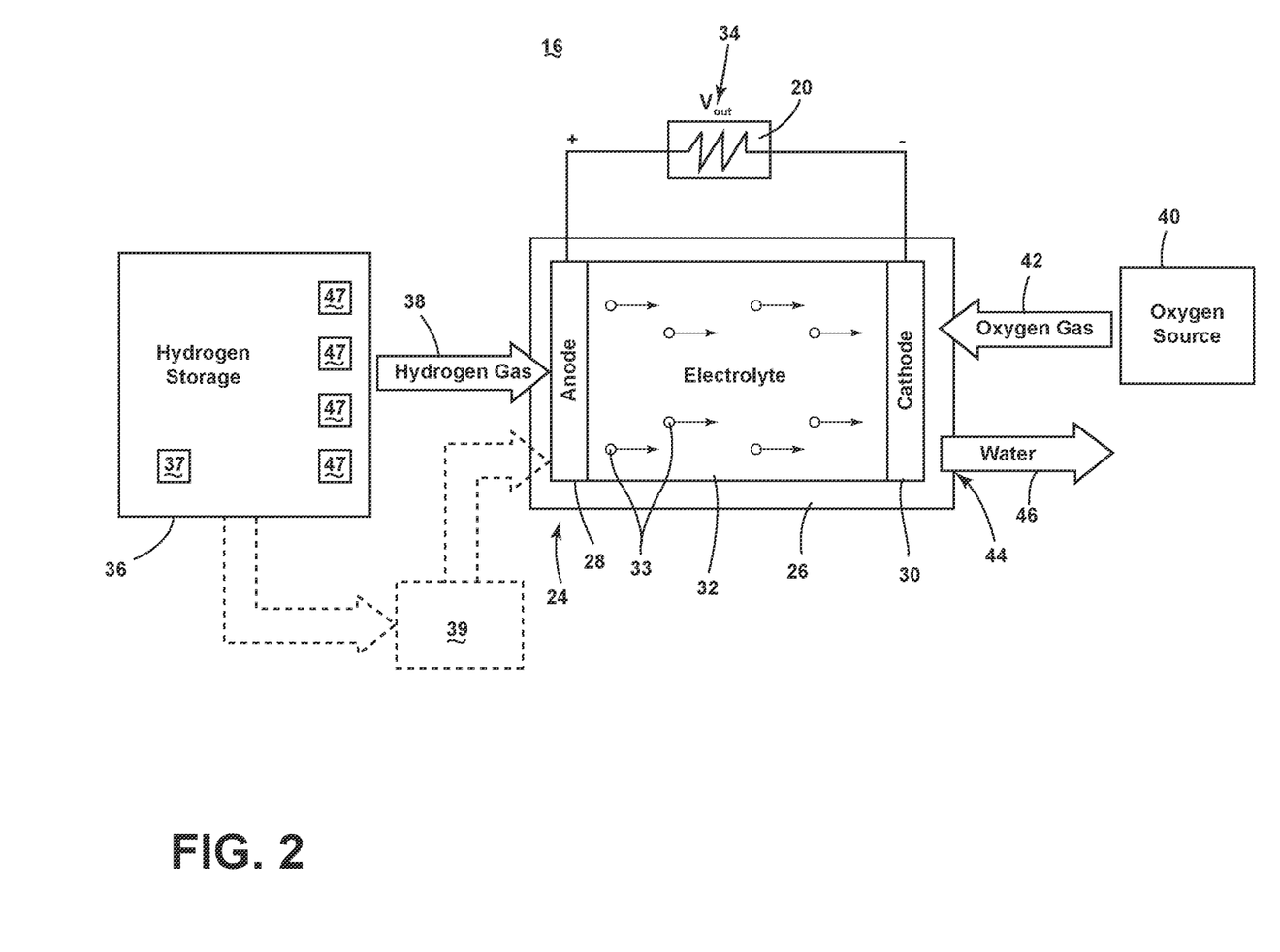
FIG. 2 illustrates a schematic view of the operation of a fuel cell in accordance with various aspects described herein.

FIG. 2 illustrates an example configuration of operation of an emergency power source 16, shown as a fuel cell system 24, in accordance with various aspects described herein. The fuel cell system 24 includes a fuel cell 26 including an anode 28 (positive side of the fuel cell 26) and cathode 30 (negative side of the fuel cell 26) separated by an electrolyte 32 that allows positively charged hydrogen ions 33 to move between the anode 28 and cathode 30. The fuel cell 26 can include a voltage output 34 electrically coupled with the anode 28 and cathode 30 to provide current or electrical power generated between the anode 28 and cathode 30. The voltage output 34 can, for example, power one or more electrical loads 20, illustrated by a representative single load 20.

The fuel cell system 24 additionally includes a hydrogen storage system 36 including a set of hydrogen storage units 47 in communication with the anode 28 of the fuel cell 26 such that the hydrogen storage system 36 can provide hydrogen gas 38 to the anode 28. Each of the hydrogen storage units 47 can be configured to provide the hydrogen gas 38 independently of, or simultaneous with, other units 47, as designed base on the hydrogen gas 38 needs or demands of the fuel cell system 24. The hydrogen storage system 36 can optionally include a controller module 37 configured to control the operation of the storage system 36 or the operation of the set of hydrogen storage units 47, which will be further explained below. The fuel cell system 24 can further include an oxygen source 40 configured to provide oxygen gas 42 to the cathode 30 of the fuel cell 26, and a water outlet 44 for removing water 46 from the cathode 30 of the fuel cell 26. While an oxygen source 40 is depicted, other sources of oxygen can be included, such as ambient air.

The fuel cell system 24 can optionally include an intermediary hydrogen gas storage unit 39, illustrated in dotted outline, configured to store the hydrogen gas 38 or excess hydrogen gas 38 that has been provided by the hydrogen storage system 36 or hydrogen storage units 47. Configurations of the fuel cell system 24 can be included wherein the hydrogen gas 38 is supplied to the anode 28 only by way of the optional intermediary hydrogen gas storage unit 39. One non-limiting example of an intermediary hydrogen gas storage unit 39 can include a pressurized storage tank.

The anode 28 or cathode 30 can further include one or more catalysts that cause, encourage, or promote the hydrogen gas 38 to undergo oxidation reactions to generate the hydrogen ions 33 and electrons. The ions 33 can then traverse the electrolyte 32, while the electrons are drawn to the voltage output 34 or electrical load 20. In this sense, the fuel cell 26 can generate direct current (DC). At the cathode 30, the hydrogen ions 33, the electrons, and oxygen gas 42 form the water 46 which is removed from the fuel cell 26 by way of the water outlet 44.

The anode 28 and cathode 30 can be selected from various conductive materials having a potential difference and configured to produce the above-described chemical reactions. Particular anode 28 or cathode 30 materials are not germane to the invention. Additionally, the electrolyte 32 can be selected from various electrolytic materials configured for fuel cell 26 operations, including, but not limited to proton exchange membrane-type fuel cells (PEM fuel cells, or PEMFC) or solid oxide-type fuel cells. Additionally, while the fuel cell 26 is schematically illustrated as a single "cell" having one anode 28, one cathode 30, and one electrolyte 32, embodiments of the disclosure are envisioned wherein individual cells are "stacked," or placed in series, to create a desired voltage output 34 configured to meet a particular operating requirement. For example, an emergency power source 16 can be required to deliver DC power at 270V DC. Additional or alternative power operating requirements are envisioned wherein, for example, multiple stacked fuel cells 26 can be configured in parallel to provide additional current. Moreover, while the illustrated embodiment describes a DC voltage fuel cell system 24, embodiments of the disclosure are equally applicable with fuel cell systems 24 configured to provide an alternating current (AC) voltage output, for example, by way of an inverter system (not shown).

Figure 3:
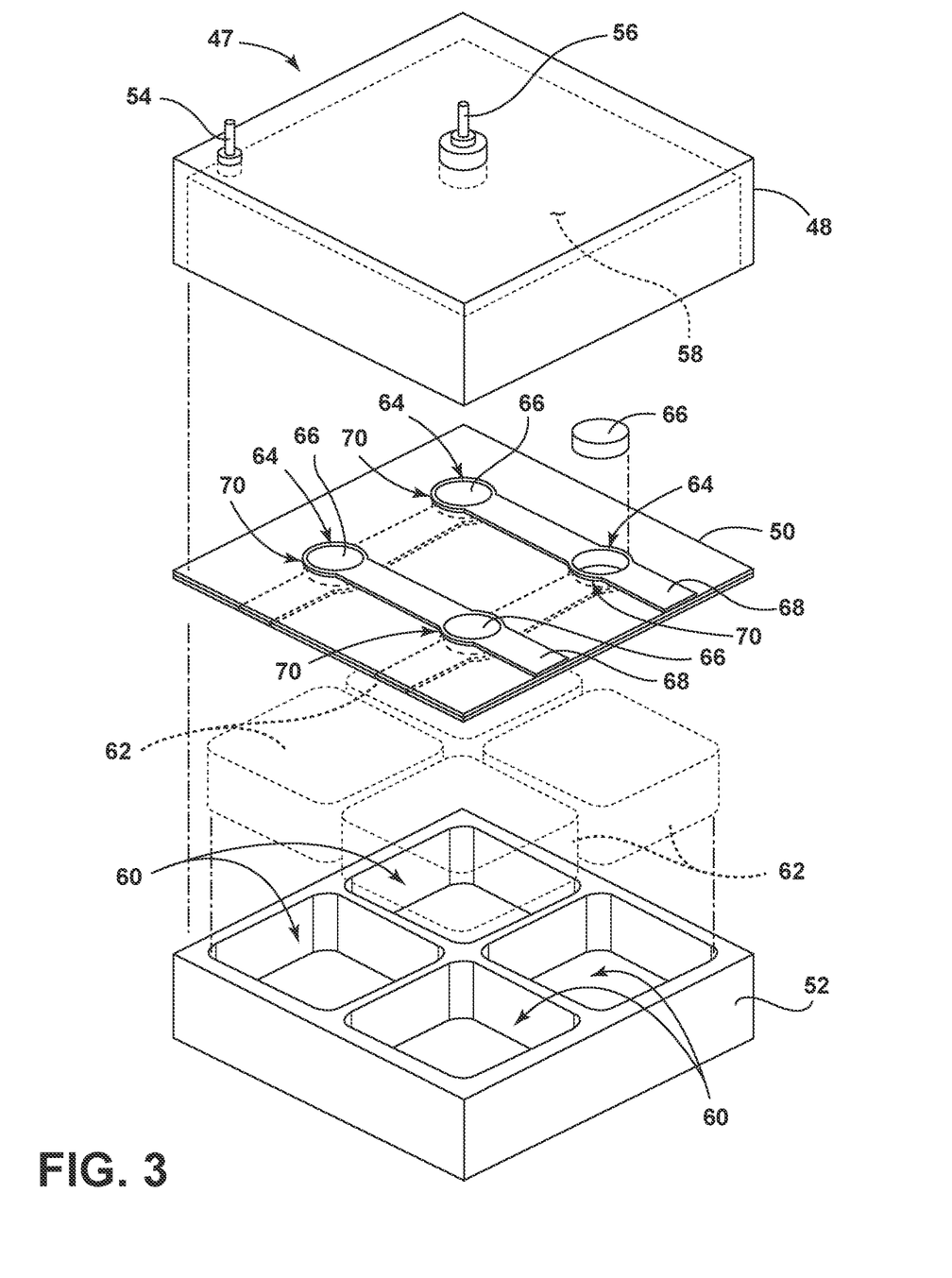
FIG. 3 illustrates a perspective view of a solid hydrogen storage system, in accordance with various aspects described herein.

FIG. 3 illustrates an example of a hydrogen storage unit 47 for the hydrogen storage system 36 having a first housing, shown as an upper manifold 48, a solid state delivery system, shown as a dividing plane 50, and a second housing, shown as a lower manifold 52. The upper manifold 48 can include an inlet 54, a gas outlet 56, and can define an interior 58, illustrated in dotted line underneath the top manifold 48. The interior 58 is fluidly coupled with the inlet 54 and the gas outlet 56.

The inlet 54 can be fluidly coupled with a reactant reservoir (not shown) and configured to deliver the reactant, such as water or steam, to the interior 58 of the upper manifold 48. The reactant can be dispersed within the interior 58 of the upper manifold.

The gas outlet 56 can include a port or via configured to deliver hydrogen gas located in the interior 58 of the upper manifold 48 to a fluidly coupled destination, such as the intermediary hydrogen gas storage unit 39 or the fuel cell 26. Embodiments of the gas outlet 56 can be further configured such that only hydrogen gases are allowed pass through the outlet 56. For example, the gas outlet can include a gas-permeable membrane or the like configured to allow only hydrogen gases to permeate the membrane. In this sense, other materials that can be located in the interior 58 of the upper manifold 48, including, but not limited to steam or water, will be prevented from passing through the gas outlet 56.

The lower manifold 52 can be configured to define a set of chambers 60 configured to hold corresponding hydrogen storage solids 62. The set of chambers 60 are illustrated as substantially squared chambers 60 having slightly rounded corners, however alternative geometric patterns can be included. Alternative geometric patterns for the set of chambers 60 can include, but are not limited to, triangles, trapezoids, circles, ovals, rectangles, hexagons, and the like, or a combination thereof. Additionally, various configurations of the set of chambers 60 are envisioned and can include, for example, different sizes, shapes, volumes, or the like, in a single lower manifold 52 embodiment. Regardless of the configuration of the set of chambers 60 or lower manifold 52, embodiments of the disclosure envision the hydrogen storage solids 62 in powdered form or pressed powder "cake" form correspond to, aligned with, or are keyed to be received or held by the set of chambers 60.

When assembled, the upper manifold 48, lower manifold 52, and dividing plane 50 can be coupled together to create a pressure-sealed assembly, wherein the inlet 54 and gas outlet 56 provide the only access for fluid or gaseous ingress or egress. The dividing plane 50 can operate as a solid state delivery system, in that it can further divide the pressure-sealed hydrogen storage unit 47 such that the interior 58 of the upper manifold 48 defines a first pressure-sealed compartment, while at least a subset of the chambers 60 can define a second pressure-sealed compartment or compartments.

As used herein, a hydrogen storage solid 62 can include a chemical composition including hydrogen molecules, wherein the composition is in a solid state or solid form. Non-limiting examples of hydrogen storage solids 62 can include metal hydrides, such as lithium hydride (LiH), or magnesium hydride ($MgH_2$), which can be produced, developed, or included in the set of chambers 60 as a powder, or pressed-powder "cake." Additional hydrogen storage solid 62 materials in additional solid state forms are envisioned.

The dividing plane 50 can include a planar structure configured to separate the upper manifold 48 from the lower manifold 52. The dividing plane 50 can further include a set of ports 64, vias, apertures, or the like that provide an opening through the dividing plane 50. The dividing plane 50 can further include a set of plugs 66 corresponding to the set of ports 64, wherein the set of plugs 66 are sized, shaped, or keyed to block, plug, or otherwise prevent fluid traversal through the set of ports 64. The set of plugs 66 can further include deformable materials, such as a material that is meltable when exposed to heat, or soluble or dissolvable when exposed to water.

The dividing plane 50 is further illustrated including an optional set of electrical leads or conductors 68 and optional resistive elements 70 or material electrically coupled between at least two electrical conductors 68. The resistive elements 70 can be positioned proximate to the set of ports 64 and set of plugs 66, or on an inner surface of the set of ports 64, and configured or selected such to generate heat when exposed to electrical current. In this sense, when current is applied to a set of electrical conductors 68, the resistive element 70 can generate heat proximate to the set of ports 64 or set of plugs 66, for example, breaking down a bond between the dividing plane 50 or port 64 and the plug 66. In one embodiment, the resistive elements 70, position of the resistive element 70 proximate to the set of plugs 66, or composition of the plugs 66 can be selected such that an amount of heat generated by the resistive element 70 when exposed to a known or predetermined amount of electric current is sufficient to fully or partially melt or deform the proximate plug 66, resulting in a "purposeful failure" of the plug 66. In another embodiment, the set of plugs 66 can include the resistive element 70 configured to generate heat. In yet another embodiment, the heating effect may not be generated by the via. The heat may be generated by one or more dedicated resistive heating elements 70 that are encased in, incorporated with, or combined with the set of plugs 66, themselves. For instance, a dividing plane 50 in the form of a multi-layer printed circuit board (PCB) can include the resistive heating elements 70 configured to extend from the PCB sides at the set of ports 64 into the aperture of the ports 64, or into the set of plugs 66. In one non-limiting example, the heating elements 70 can be made from one or more copper layers.

As used herein, a "purposeful failure" of a plug 66 can include the removal of the plug 66 from the corresponding port 64, or any intended opening of the plug 66 or port 64 relationship such that the dividing plane 50 allows for fluid traversal through the respective port 64. Embodiments of the disclosure are envisioned wherein a matrix or array of a set of electrical conductors 68 or resistive elements 70 can be configured to provide for individual or selectable heating or failures of the set of plugs 66. Additionally, the set of electrical conductors 68 or resistive elements 70 can be incorporated with embodiments of the dividing plane 50. For example, the dividing plane 50 can include a printed circuit board.

The set of ports 64 and corresponding set of plugs 66 can be arranged to align or further correspond with the set of chambers 60 of the lower manifold 52 and the interior 58 of the upper manifold. For example, the dividing plane 50 can be configured such that a subset of the ports 64 can be aligned to provide access between a single, or a set of the chambers 60 and the interior 58, depending on whether the corresponding subset of plugs 66 have purposely failed or remain intact. Stated another way, the set of ports 64 can be arranged such that the set, or a subset of chambers 60, are fluidly isolated from the interior 58 while a corresponding plug 66 is held by the respective port 64, and such that the set, or a subset of chambers 60, are fluidly coupled with the interior while the corresponding plug 66 has purposely failed or has been otherwise removed from the respective port 64. Additionally, any number of ports 64 and plugs 66 can be configured to provide redundant access to one or more of the set of chambers 60. For example, multiple plugs 66 can be configured to controllably deform or fail by different methods to ensure reliable operation, as described herein. Additionally, multiple heating elements can be included in or at each port 64 or plug 66 for redundancy While a set of electrical conductors 68 and resistive elements 70 have been described, alternative configurations can be include to cause a purposeful failure of the set of plugs 66 relative to the set of ports 64. For example, the dividing plane 50 can include a thermally conductive material, such that heat supplied to the dividing plane 50 from an external heat source can cause a resulting melting or deformation of at least a subset of the plugs 66, as described above. In another embodiment of the disclosure, heat supplied to the interior 58 of the upper manifold 48, by way of the inlet 54, can be utilized melt or deform at least a subset of the plugs 66. In yet another embodiment, at least a subset of the plugs 66 can include a soluble or water-dissolvable material, which deforms or dissolves in response to water supplied to the interior 58 of the upper manifold 48, by way of the inlet 54.

Embodiments of the hydrogen storage unit 47 operate by freeing, releasing, or otherwise liberating hydrogen gases stored in the hydrogen storage solid 62, for instance by way of a chemical reaction, and delivering the liberated hydrogen gases to the fuel cell 26 via the gas outlet 56. In a first example embodiment, a defined quantity of water or other fluid can be supplied or introduced to the pressure-sealed interior 58 of the upper manifold 48 via the inlet 54. For example, the water, or another fluid, such as acid or acetic acid, can be supplied or introduced during manufacture of the hydrogen storage unit 47 to prefill or pressurize the pressure-sealed interior 58 of the upper manifold 48. No chemical reaction takes place while the set of plugs 66 remain in place, fluidly isolating the interior 58 from the set of chambers 60. The hydrogen storage unit 47 can be configured to controllably deform a subset of the plugs 66, or otherwise unplug the set of ports 64, which resultantly fluidly couples the interior 58 of the upper manifold 48 with at least one chamber 60 of the lower manifold 52. The control can be initiated or selectable by way of a control signal from the controller module 37, or in response to a signal from the controller module 37. For example, the controlling of the deformation of the subset of plugs 66 can include current traversing a subset of the electrical conductors 68 coupled with the controller module 37, or by delivering a reactant or heat to the inlet 54 of the upper manifold 48, as explained above.

The fluid coupling between the interior 58 and at least one chamber 60 holding the hydrogen storage solid 62 allows the water or other fluid located in the interior 58 of the upper manifold 48 to permeate or traverse the dividing plane 50 to the lower manifold 52, wherein the reactant can chemically react with the hydrogen storage solid 62. For instance, in embodiments wherein the hydrogen storage solid 62 is lithium hydride and the other reactant is water, the chemical reaction releases hydrogen gas and lithium hydride, as follows:

The resulting hydrogen gases can further traverse from the lower manifold 52, through the open set of ports 64 of the dividing plane 50, through the interior 58 of the upper manifold 48, and be delivered to the fuel cell 26, as explained herein. While one non-limiting example of water and lithium hydride is described, embodiments of the disclosure can include a solid state delivery system configured to provide selective or controllable access via the set of the ports 64 and the set of the plugs 66 to initiate a chemical reaction to mix a liquid or gas with another liquid, gas, or solid.

The reactant delivered to the interior 58 of the upper manifold 48 can provide a pressure increase in the upper manifold 48, which can increase the temperature of the interior 58 of the upper manifold 48. The steam can further be utilized to increase the temperature of the interior 58 of the upper manifold 48. The increase in temperature can be used to increase the speed of the kinetics of the reaction, thus increasing the rate of hydrogen gases released, for example, per minute. Additionally, embodiments wherein the set of plugs 66 can include at least one catalyst material selected to increase the kinetics or rate of the reaction. The chemical reaction is also exothermic, meaning there is a release of energy in the form of heat, which can further increase the speed of the kinetics of the reaction.

The amount of hydrogen storage solid 62, or the configuration of the upper manifold 48, lower manifold 52, set of ports 64, set of plugs 66, set of chambers 60, number of components, or form and amount of the reactant introduced into the interior 58 can be selectively configured to meet a set of predetermined criteria. For example, the set of predetermined criteria can include, but is not limited to, a target amount of hydrogen gases liberated per a period of time (e.g. a flow rate of 1 kg of hydrogen per hour, etc.), a target time to release the hydrogen gases as soon as possible (e.g. the fastest chemical reaction), a target time to release the hydrogen gases as slowly as possible (e.g. the slowest chemical reaction), or a target pressure in the pressure-sealed hydrogen storage unit 47 (e.g. maintain the pressure between 6 bar and 15 bar).

Embodiments of the chemical reactions described herein are non-reversible. In this sense, once the chemical reactions described above have completed, they cannot be "recharged" to restore the hydrogen gases in the hydrogen storage solids 62. Thus, embodiments of the disclosure are envisioned wherein the hydrogen storage units 47 are removably installed in the hydrogen storage system 36, such that spent (e.g. previously reacted) hydrogen storage units 47 can be replaced during maintenance operations. The spent hydrogen storage units 47 can be, for example, returned for refurbishment or refilling with new or unspent hydrogen storage solid 62.

The controller module 37 of the hydrogen storage system 36 can be configured to control the operation of the storage system 36 or the operation of the set of hydrogen storage units 47, to release hydrogen gases stored in the hydrogen storage solid 62. The controller module 37 can control these operations based on, for example, receiving a demand signal indicative of a demand for hydrogen gases. The demand signal can originate from an aircraft system indicating a supplemental amount of electrical power is requested to be generated by the fuel cell system 24 (and thus the need for hydrogen gases), or that the aircraft 10 requires power from the emergency power source 16 during emergency operations. In such an example, the controller module 37, in response to receiving the demand signal, can control the initiation of the aforementioned chemical reactions in a subset of hydrogen storage units 47, by selectively supplying water or another fluid to the subset of hydrogen storage units 47. The resulting chemical reactions can then liberate the hydrogen gases from the hydrogen storage solids 62, as explained herein.

The initiation of the chemical reactions in the subset of hydrogen storage units 47 can occur by way of selectively enabling access or transmission pathways for the water, steam, or heat, as needed. In this sense, the controller module 37 can be controllably coupled with, for example, a water source providing water or steam, or a set of valves controlling water or steam access to a selective subset of hydrogen storage units 47 having lithium hydride-based hydrogen storage solids 62. Alternatively, the initiation of the chemical reactions in the subset of hydrogen storage units 47 can occur by way of selectably causing the deformation or removal of a subset of the plugs 66, as needed. In this sense, the controller module 37 can electrically coupled with at least a set of electrical conductors 68 such that it can enable heating of the resistive element 70 of the dividing plane 50 in order to melt, deform, or cause the subset of plugs 66 to otherwise fail.

Additionally, embodiments of the demand signal can include a signal that provides a binary indication of a demand for hydrogen gases, and the controller module 37 can operate a portion of a computer program having an executable instruction set for controlling the liberation of the hydrogen gases from the hydrogen storage units 47 according to a predetermined profile, predetermined design, or operational characteristic, as described above. The fuel cell 26 can then generate electricity from the liberated hydrogen gases.

The computer program having an executable instruction set can be included as part of, or accessible by, the controller module 37 in a machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, and the like, that have the technical effect of performing particular tasks or implement particular abstract data types. Machine-executable instructions, associated data structures, and programs represent examples of program code for executing the exchange of information as disclosed herein.

Alternatively, embodiments of the demand signal are envisioned wherein the demand signal can further include a quantitative element of the demand for hydrogen gases, for instance, a high demand, a medium demand, or a low demand. The quantitative element of the demand for hydrogen gases can be further related to, for example, different operating profiles for supplemental power (e.g. a small amount of supplemental power versus a large amount of supplemental power). The quantitative element of the demand for hydrogen gases can have the technical effect of operating different computer programs, or modifying the execution of the computer programs to adjust for the particular demand.

The controller module 37 can also operate by, for example, controllably staggering the initiating of the chemical reactions in respective hydrogen storage units 47 based on the predetermined profile, predetermined design, or operational characteristics of the fuel cell system 24, as explained above. Many other possible embodiments and configurations in addition to that shown in the above figures are contemplated by the present disclosure. For example, the controllably deformation of the set of plugs 66 can include accounting for a pressure differential between the pressure-sealed interior 58 of the upper manifold 48 and the set of chambers 60 of the lower manifold 52. In this sense, the controllable deformation can take into account a fluidly coupling the interior 58 with a subset of the chambers 60 due to a slight deformation, which when combined with the pressure differential, causes the plug 66 to fail. In another embodiment, the controller module 37 can be configured to limit the amount of current supplied to or by the electrical conductors 68 to prevent or reduce the chance of inadvertent ignition of the hydrogen gas generated by the chemical reaction. In this embodiment, the controller module 37 can include a thermal fuse in-line with the electrical conductors 68 to prevent current from surpassing a predetermined amount. In yet another embodiment, the set of plugs 66 or the set of ports 64 can be configured to prevent inadvertent failure due to, for instance, vibrations. For example, additional mechanisms such as wire straps, or plug primers can include or require additional activation prior to plug 66 deformation. Additionally, the design and placement of the various components can be rearranged such that a number of different in-line configurations could be realized.

Figure 4:
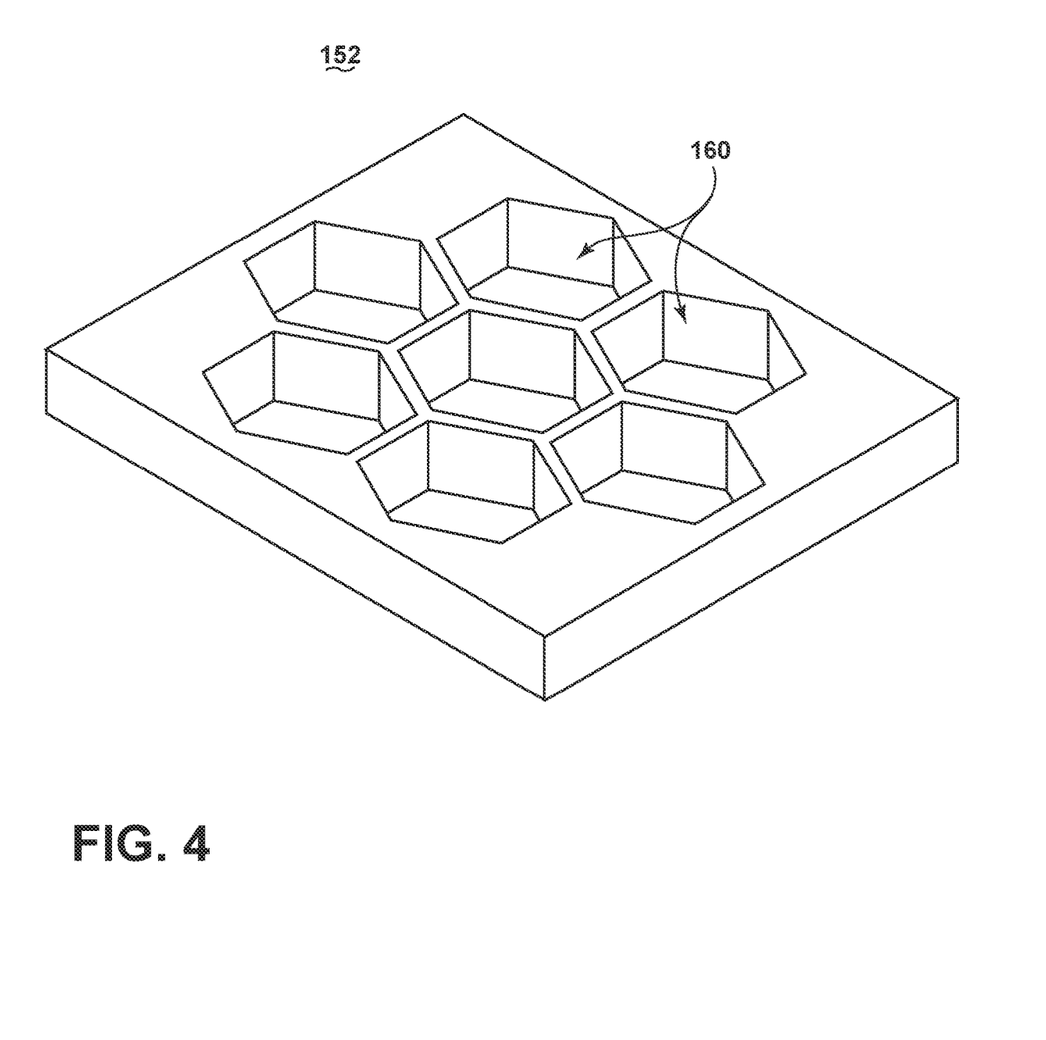
FIG. 4 illustrates a perspective view of a second embodiment of a lower manifold of the sold hydrogen storage system of FIG. 3, in accordance with various aspects described herein.

FIG. 4 illustrates an alternative embodiment of the lower manifold 152 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the lower manifold 152 includes a set of chambers 160 having a hexagonal chamber configuration. While not shown, embodiments of the upper manifold 48 are envisioned to include the set of ports 64 and set of plugs 66 configured to align with or correspond to the set of chambers 160. In the second embodiment of the lower manifold 152, the hexagonal configuration of the set of chambers 160 can store or hold the hydrogen storage solid 62 in a greater, lesser, or equal quantity as the first embodiment in a different number of chambers or a different volume of solid 62 per chamber 160. This configuration of alternative configuration or quantity of the hydrogen storage solid 62 held by or otherwise disposed in the set of chambers 160 can allow for improved precision in controlling the initiating or sustaining of the chemical reaction described herein in.

Figure 5:
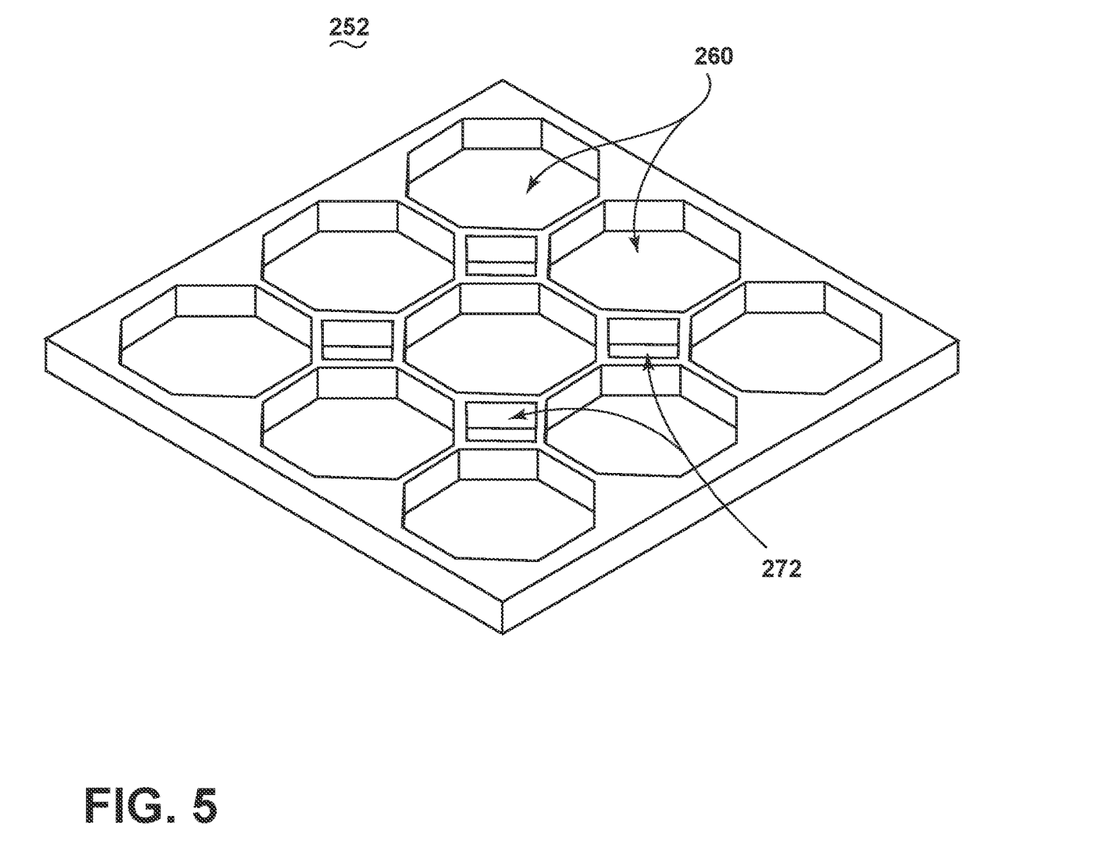
FIG. 5 illustrates a perspective view of a third embodiment of a lower manifold of the sold hydrogen storage system of FIG. 3, in accordance with various aspects described herein.

FIG. 5 illustrates an alternative embodiment of the lower manifold 252 according to a third embodiment of the invention. The third embodiment will additionally include like parts identified with like numerals increased by 200, with it being understood that the description of the like parts of the first embodiment applies to the prior embodiments, unless otherwise noted. A difference between the prior embodiments and the third embodiment is that the lower manifold 252 includes a first set of chambers 260 having a hexagonal chamber configuration and configured to hold a first quantity or volume of hydrogen storage solid 62, and a second set of chambers 272 having a square chamber configuration and configured to hold a second quantity or volume of hydrogen storage solid 62, wherein the second quantity is less than the first quantity. While not shown, embodiments of the upper manifold 48 are envisioned to include the set of ports 64 and set of plugs 66 configured to align with or correspond to the first and second sets of chambers 260, 272.

In the third embodiment of the lower manifold 252, the variance between the quantity of hydrogen storage solid 62 between the first set of chambers 260 and the second set of chambers 272 can allow for yet further improved precision in controlling the initiating or sustaining of the chemical reaction described herein. For instance, in response to a hydrogen gas demand signal, the controller module 37 could initiate the chemical reaction described herein in a subset of the first set of chambers 260 and a subset of the second set of chambers 272. This variance provides for improved capabilities to match the demand for hydrogen gas, wherein, for example, less precision of initiating or maintaining the chemical reaction (e.g. using multiple chambers of the first embodiment of the disclosure) would produce excess hydrogen gas that would otherwise go unused, underutilized, or wasted. Alternatively the second set of chambers 272 can further be utilized as sacrificial testing, or built in test, chambers that can be controllably used to validate or verify the operation of the hydrogen storage system 36, hydrogen storage unit 47, or hydrogen storage solid 62, for example, after a prolonged period without use. While square and hexagonal chambers 260, 272 are illustrated, additional geometric chamber patterns can be included.

Figure 6:
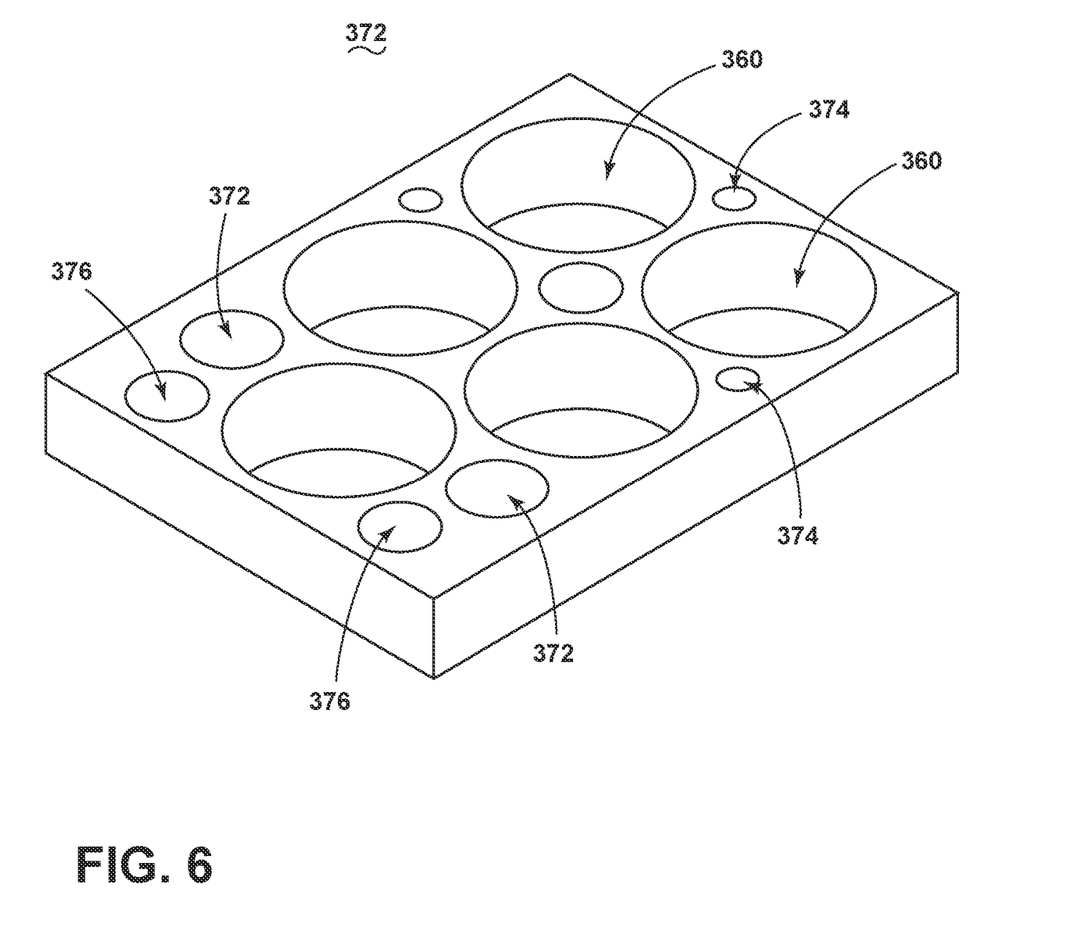
FIG. 6 illustrates a perspective view of a fourth embodiment of a lower manifold of the sold hydrogen storage system of FIG. 3, in accordance with various aspects described herein.

FIG. 6 illustrates an alternative embodiment of the lower manifold 352 according to a fourth embodiment of the invention. The fourth embodiment will additionally include like parts identified with like numerals increased by 300, with it being understood that the description of the like parts of the first embodiment applies to the prior embodiments, unless otherwise noted. A difference between the prior embodiments and the third embodiment is that the lower manifold 352 includes a first set of chambers 360 having a large-sized circular chamber configuration and configured to hold a first quantity or volume of hydrogen storage solid 62, and a second set of chambers 372 having a medium-sized chamber configuration and configured to hold a second quantity or volume of hydrogen storage solid 62, and a third set of chambers 374 having a small-sized circular chamber configuration and configured to hold a third quantity or volume of hydrogen storage solid. In this sense, the second quantity is less than the first quantity, and the third quantity is less than the second quantity. While not shown, embodiments of the upper manifold 48 are envisioned to include the set of ports 64 and set of plugs 66 configured to align with or correspond to the sets of chambers 360, 372, 374.

In the fourth embodiment of the lower manifold 352, the variance between the quantity of hydrogen storage solid 62 between the first, second, and third sets of chambers 360, 372, 374 can allow for yet further improved precision in controlling the initiating or sustaining of the chemical reaction described herein in, as explained in the third embodiment. While varying sized circular chambers 360, 372, 374 are illustrated, additional geometric chamber patterns can be included.

The embodiments disclosed herein provide a method and apparatus for releasing hydrogen gas from a hydrogen storage solid. The technical effect is that the above described embodiments enable the controlled liberation of the hydrogen gases in accordance with design considerations and operational characteristics described herein. One advantage that can be realized in the above embodiments is that the above-described embodiments have superior hydrogen storage capabilities without the safety concerns of storing gaseous hydrogen at high pressures. The solid-state storage of the hydrogen minimalizes the potential energy of the hydrogen storage system, eliminates the danger hydrogen gas leaks at high pressure storage, and ensures the longevity of the hydrogen being stored. Longevity of the hydrogen being stored leads to fewer maintenance operations to maintain the overall system.

Additionally, because the above-described embodiments of the disclosure operate at low pressures, no high pressure hydrogen infrastructure is required, reducing manufacturing and certification costs. Thus, the capabilities of hydrogen gases on demand provide for safer handling, lower pressure systems, and multiple methods of controlling the chemical reactions, ensuring the low pressure environment.

Another advantage of the above-described embodiments is that the individualized hydrogen storage units, along with selective control of each unit, result in a hydrogen storage system that can be scaled to for the amount of hydrogen gases supplied, providing efficiencies of size and weight to suit the need. Additionally, the hydrogen storage solids described herein have a high hydrogen storage capacity, providing a high weight of stored hydrogen, and a lower overall system weight. In yet another advantage, non-reversible or non-rechargeable hydrogen storage solids can be individually replaced, as described herein. When designing aircraft components, important factors to address are size, weight, and reliability. The above described hydrogen storage system results in a lower weight, smaller sized, increased performance, and increased reliability system. The stable storage of hydrogen in a solid state reduces maintenance needs and will lead to a lower product costs and lower operating costs. Reduced weight and size correlate to competitive advantages during flight.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A solid state delivery system, comprising:
a first housing defining a first interior and having an inlet for coupling the interior to a source of at least one of heat or a reactant and an outlet configured to permit gas to exit the first interior;
a second housing defining a second interior having a hydrogen storage solid; and
a dividing plane separating the first interior from the second interior and having at least one port between the first interior and the second interior blocked by at least one deformable plug;
wherein the at least one deformable plug is configured to be selectably deformed to open the at least one port, fluidly coupling the first interior and the second interior, and wherein when the at least one of heat or reactant is introduced to the first interior via the inlet and when the at least one deformable plug is deformed to open the at least one port, hydrogen gas is supplied to the outlet.

2. The solid state delivery system of claim 1, wherein the dividing plane includes electrical conductors coupling a resistive element with a controller module, wherein the resistive element is positioned proximate to the at least one deformable plug and is configured to generate heat in response to electrical current supplied to the electrical conductors by the controller module.

3. The solid state delivery system of claim 2, wherein the at least on deformable plug comprises a meltable plug, and at least a portion of the meltable plug is configured to fail in response to heat generated by the resistive element.

4. The solid state delivery system of claim 1, wherein the dividing plane is a printed circuit board.

5. The solid state delivery system of claim 1, wherein the at least one deformable plug comprises a water-dissolvable plug, and at least a portion of the water-dissolvable plug is configured to fail in response to water supplied to the first housing.

6. The solid state delivery system of claim 1 wherein the first housing, second housing, and dividing plane are coupled such that the first interior and the second interior are pressure-sealed and configured for exposure to pressure between 6 bar and 15 bar.

7. The solid state delivery system of claim 1, further comprising a controller module configured to controllably deform the at least one deformable plug to open the at least one port, fluidly coupling the first interior with the second interior.

8. The solid state delivery system of claim 1, wherein a chemical reaction liberates hydrogen gas from the hydrogen storage solid.

* * * * *